(12) United States Patent
Suzuki

(10) Patent No.: US 11,125,212 B2
(45) Date of Patent: Sep. 21, 2021

(54) WIND POWER GENERATION SYSTEM WITH SPEED-DEPENDENT CONTROL OF ENGAGEMENT AND DISENGAGEMENT OF A ROTOR AND GENERATOR

(71) Applicant: NTN CORPORATION, Osaka (JP)

(72) Inventor: Masahiko Suzuki, Hamamatsu (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/078,825

(22) PCT Filed: Dec. 7, 2016

(86) PCT No.: PCT/JP2016/086366
§ 371 (c)(1),
(2) Date: Aug. 22, 2018

(87) PCT Pub. No.: WO2017/145490
PCT Pub. Date: Aug. 31, 2017

(65) Prior Publication Data
US 2019/0055927 A1 Feb. 21, 2019

(30) Foreign Application Priority Data
Feb. 24, 2016 (JP) .............................. JP2016-033061

(51) Int. Cl.
*F03D 7/06* (2006.01)
*F03D 15/00* (2016.01)
(Continued)

(52) U.S. Cl.
CPC .............. *F03D 7/06* (2013.01); *F03D 3/005* (2013.01); *F03D 9/25* (2016.05); *F03D 15/00* (2016.05);
(Continued)

(58) Field of Classification Search
CPC . F03D 15/00; F03D 3/005; F03D 7/06; F03D 9/25; F05B 2260/4023; F05B 2270/20; F05B 2270/32; Y02E 10/722
(Continued)

(56) References Cited

U.S. PATENT DOCUMENTS 2,417,022 A * 3/1947 Stagg .................... F03D 7/0212
416/15
4,039,849 A * 8/1977 Mater .................... B60K 16/00
290/55
(Continued)

FOREIGN PATENT DOCUMENTS

CN 1871433 A 11/2006
CN 102900622 A 1/2013
(Continued)

OTHER PUBLICATIONS

International Search Report Corresponding to PCT/JP2016/086366 dated Mar. 7, 2017.
(Continued)

*Primary Examiner* — Tulsidas C Patel
*Assistant Examiner* — S. Mikailoff
(74) *Attorney, Agent, or Firm* — Finch & Maloney, PLLC; Michael J. Bujold; Jay S. Franklin

(57) ABSTRACT

A wind power generation method capable of efficiently generating electricity while preventing a rotor from stalling. A generator (3) is connected to a vertical main shaft (5) of a rotor (2) via a clutch (9). The method comprising repeating the following steps: disconnecting the clutch when the rotor is rotating at or below a predetermined average wind speed, to idle the rotor, connecting the clutch for generating power by the generator when the rotor reaches a specific peripheral speed or rotational speed, again disconnecting the clutch when the rotor is rotating at or below the predetermined
(Continued)

average wind speed to idle the rotor until the specific value of peripheral speed or rotational speed is reached, and again connecting the clutch for generating power by the generator once the rotor reaches the specific value.

3 Claims, 5 Drawing Sheets

(51) Int. Cl.
*F03D 9/25* (2016.01)
*F03D 3/00* (2006.01)

(52) U.S. Cl.
CPC ... *F05B 2260/4023* (2013.01); *F05B 2270/20* (2013.01); *F05B 2270/32* (2013.01); *Y02E 10/72* (2013.01)

(58) Field of Classification Search
USPC ................................................ 290/44, 55
See application file for complete search history.

(56) References Cited

U.S. PATENT DOCUMENTS

| | | | | | |
|---|---|---|---|---|---|
| 4,229,661 | A | * | 10/1980 | Mead | F03D 9/17 290/44 |
| 4,464,579 | A | * | 8/1984 | Schwarz | F03D 7/026 290/44 |
| 4,613,763 | A | * | 9/1986 | Swansen | F03D 7/026 290/44 |
| 4,649,284 | A | * | 3/1987 | Hsech-Pen | F03D 7/06 290/55 |
| 4,653,982 | A | * | 3/1987 | Kojima | F03D 7/0224 416/3 |
| 7,360,995 | B2 | * | 4/2008 | Suzuki | F03D 3/02 416/211 |
| 7,843,077 | B2 | * | 11/2010 | Arduini | F03D 1/04 290/43 |
| 2006/0055377 | A1 | | 3/2006 | Okubo et al. | |
| 2007/0071604 | A1 | * | 3/2007 | Suzuki | F03D 3/02 416/197 A |
| 2008/0093860 | A1 | * | 4/2008 | Suzuki | F03D 1/0608 290/55 |
| 2008/0284168 | A1 | * | 11/2008 | Arduini | F03D 1/04 290/43 |
| 2010/0135767 | A1 | * | 6/2010 | Arduini | F16D 41/12 415/1 |
| 2013/0277981 | A1 | * | 10/2013 | Turck | F03D 7/0272 290/55 |
| 2015/0115607 | A1 | | 4/2015 | Stepanov | |
| 2019/0055918 | A1 | * | 2/2019 | Suzuki | F03D 1/0641 |
| 2019/0055927 | A1 | * | 2/2019 | Suzuki | F03D 15/00 |

FOREIGN PATENT DOCUMENTS

| | | | |
|---|---|---|---|
| JP | 2002-327678 | A | 11/2002 |
| JP | 2006-118384 | A | 5/2006 |
| JP | 2008-163745 | A | 7/2008 |
| JP | 4740580 | B2 | 8/2011 |
| JP | 2011-169292 | A | 9/2011 |
| JP | 2011169292 | A * | 9/2011 |
| JP | 4907073 | B2 | 3/2012 |
| WO | 2014/186867 | A1 | 11/2014 |

OTHER PUBLICATIONS

Written Opinion Corresponding to PCT/JP2016/086366 dated Mar. 7, 2017.

Chinese Office Action dated Sep. 4, 2019 in corresponding Chinese Patent Application.

* cited by examiner

WIND POWER GENERATION SYSTEM WITH SPEED-DEPENDENT CONTROL OF ENGAGEMENT AND DISENGAGEMENT OF A ROTOR AND GENERATOR

TECHNICAL FIELD OF THE INVENTION

The present invention relates to a wind power generation method and a wind power generation system capable of increasing power generation efficiency.

BACKGROUND OF THE INVENTION

Generally, a wind power generation system has a large mechanical loss, and a rotor is difficult to rotate smoothly under low wind speed because of cogging torque and generation load of the generator, so that power generation efficiency of the wind power generation system is low.

To solve this problem, an inventor of the present invention has developed a longitudinal axis wind power generation system equipped with a wind turbine with a lift type blade (For example, refer to JP 4907073(B2) and JP2011-169292 (A)).

The longitudinal axis wind power generation system disclosed in JP 4907073(B2) and JP2011-169292(A) includes a rotor having a pair of longitudinally elongated lift type blades opposed to each other with the vertical main shaft as a center, and an inwardly tilted parts directed in the longitudinal main axis direction is formed at each of the upper and lower end portions of each lift type blade. With this configuration, air flow diffusing in the vertical direction along the inner surface of the blade is received by the inwardly tilted part to increase the rotational force, and lift (thrust) is increased, so that the rotor can rotate efficiently.

SUMMARY OF THE INVENTION

The longitudinal axis wind turbine described in the above patent documents JP 4907073(B2) and JP2011-169292(A) has high rotation efficiency, so that the cut-in wind speed at which power generation is started can be set low, and furthermore, when the peripheral speed of the rotor reached 5 m/s, for example, the lift (thrust) generated in the blade increases due to the action of the inwardly tilted parts at the upper and lower ends of the blade and by the Coanda effect, the rotor rotates while accelerating to the peripheral speed exceeding the wind speed. For that reason, the longitudinal axis wind turbine is characterized in that stall of the rotor caused by the cogging torque or by power generation load is less likely to occur, and power generation efficiency is enhanced.

Therefore, it is considered that if the generator can be controlled as follows, it can be further increased power generation efficiency without stalling the rotor, that is, when the rotor is under a low wind speed which is susceptible to the influence of cogging torque and power generation load, temporarily stopping electric power generation and make the rotor idle, and then generate electricity after the rotor reached a peripheral speed or rotation speed at which the generator can rotate without being affected by cogging torque or power generation load.

In view of the above-mentioned issue, it is an object of the present invention to provide a wind power generation method and wind power generation system capable of efficiently generating power while preventing beforehand the rotor from stalling.

According to the wind power generation method of the present invention, the above problem is solved as follows.

(1) A wind power generation method comprising following steps to be repeated:

intermittently connecting a generator to a main shaft of a rotor of a wind turbine via a clutch;

disconnecting the clutch to idle the rotor when the rotor is rotating at or below a predetermined average wind speed;

connecting the clutch for generating power by the generator when the rotor reached a specific peripheral speed or rotational speed;

disconnecting the clutch again when the rotor is rotating at or below the predetermined average wind speed, to idle the rotor until reach the specific value of peripheral speed or rotational speed, and connecting the clutch again for generating power by the generator when the rotor reached the specific value.

According to such method, since the following processes are repeated, this enables efficient power generation while preventing stall of the rotor beforehand due to cogging torque or power generation load.

Namely, when the rotor is rotating at or below a predetermined average wind speed, the clutch is disengaged to idle the rotor, when the rotor reached a specific average peripheral speed or rotational speed that can rotate efficiently while accelerating, the clutch is connected so that electric power can be generated by the generator, when the rotor rotates again at the predetermined average wind speed or less, the clutch is disconnected again to idle the rotor until the peripheral speed or the rotational speed at which the rotor can rotate efficiently is accelerated while accelerating, and then the clutch is connected again and electricity is generated by the generator.

When the clutch is disengaged, the cogging torque and power generation load by the generator also do not act on the main shaft, so that the rotor continues to idle smoothly due to inertia. Meanwhile, if the wind condition improves even a little, the rotor is rapidly accelerated to a specific average peripheral speed or rotation speed and rotates efficiently. Therefore, the time during which power generation is stopped by disconnecting the clutch is shortened.

According to the wind power generation system of the present invention, the issue is solved as follows.

(2) A wind power generation system comprising; a wind turbine having a rotor with a plurality of blades; a generator connected to the main shaft of the rotor, a clutch which is provided between the main shaft and the generator and is capable of interrupting transmission of power between the main shaft and the generator, a rotational speed detector for detecting the peripheral speed or rotational speed of the rotor, an anemometer for detecting an average wind speed toward the rotor, and a control device, wherein the control device repeats following operations;

disconnecting the clutch to idle the rotor when the wind speed detector detects a predetermined average wind speed, connecting the clutch for generating power by the generator when the rotational speed detector detects the peripheral speed or the rotational speed of the rotor at a specific value, connecting the clutch for generating electric power by the generate, disconnecting the clutch again when the wind speed detector again detects the predetermined average wind speed, connecting the clutch again for generating power by the generator when the peripheral speed or the rotational speed of the rotor reached the specific value again.

According to such a configuration, this enables efficient power generation while preventing beforehand the rotor from stalling due to the cogging torque or the power generation load.

Namely, when the wind speed detection means detects the predetermined average wind speed, the control device disconnects the clutch to idle the rotor, when the rotation speed detection means detects that the peripheral speed or the rotation speed of the rotor has reached a specific value, the clutch is connected and the generator is controlled to generate electricity, when the wind speed detector detects the predetermined average wind speed again, the clutch is disconnected again, and when the peripheral speed or the rotational speed of the rotor reached again the specific value, the clutch is connected and the generator is repeatedly controlled to generate electricity.

In addition, when the clutch is disengaged, the cogging torque and the power generation load by the generator do not act on the main shaft, and the rotor continues to idle smoothly due to inertia, so that if the wind condition improves even a little during that period, the rotor is rapidly accelerated to a specific average circumferential speed or rotational speed and rotates efficiently. Therefore, this enables to shorten the time during which power generation is stopped by disconnecting the clutch.

(3) According to the item (2), the clutch is an electromagnetic clutch.

According to such a configuration, since the electromagnetic clutch can be intermittently and accurately controlled in a short time by the control of the control device, so that this enables to quickly idle the rotor or to start the power generation, in response to the change in the wind condition.

(4). A wind power generation system, comprising:
a wind turbine having a rotor with multiple blades;
a generator connected to a main shaft of the rotor; and
a clutch provided between the main shaft and the generator and is capable of automatically interrupting transmission of power between the main shaft and the generator,
wherein the clutch is configured to repeats following processes,
disconnecting the clutch automatically to idle the rotor when the rotor is rotating at or below a predetermined average wind speed,
connecting the clutch automatically for generating power by the generator when the rotor reached a specific peripheral speed or rotational speed,
disconnecting the clutch automatically again when the rotor is rotating at or below the predetermined average wind speed, to idle the rotor until reach the specific value of the peripheral speed or the rotational speed, and
connecting the clutch automatically again for enabling power generation by the generator when the rotor reached the specific value.

According to such a configuration, since the clutch is designed to operate repeatedly following processes, the clutch provided between the main shaft and the generator operates as follows. So that this enables to efficiently generate power while preventing beforehand the rotor from stalling due to cogging torque or power generation load.

Namely, when the rotor is rotating at or below the predetermined average wind speed, automatically disconnects the transmission of the power between the main shaft and the generator to rotate the rotor idle, when the peripheral speed or the rotation speed of the rotor reached a specific value, automatically connected for enabling power generation by the generator, when the rotor again rotates at a predetermined average wind speed or less, automatically disconnected again to idle the rotor, and when the peripheral speed or the rotation speed of the rotor reached the specific value again, automatically connected in order to enable power generation by the generator.

(5) According to the item (4), the clutch is a centrifugal clutch that automatically engages and disengages by centrifugal force accompanying rotation of the main shaft of the rotor.

According to such a configuration, since it is unnecessary to provide an electric control means for interrupting the clutch, the cost of the wind power generation system can be reduced.

(6) According to any one of the items (2)~(5), the wind turbine is a longitudinal axis wind turbine or a horizontal axis wind turbine having a rotor including a plurality of lift type blades with tilted parts formed at the tip portion thereof.

According to such a configuration, a longitudinal axis wind turbine or a horizontal axis wind turbine having a rotor provided with a plurality of lift type blades having tilted parts, this enables to increase the rotational force and increase the lift (thrust) by receiving the air current diffusing in the tip direction by hitting the blade with the tilted part. So that, as the wind speed increases, the lift (thrust) generated in the blade increases due to the Coanda effect, and the rotor is accelerated and rotates efficiently.

Therefore, this enables to increase the power generation efficiency when the clutch is connected to generate electricity.

In addition, since the time required to idle the rotor to reach a specific average peripheral speed or rotational speed is also shortened, the time during which power generation is stopped by disconnecting the clutch is further shortened, and power generation efficiency is enhanced.

(7) According to any one of the items (2)~(6), the system further comprising: a brake device that decelerates or stops the rotor when the average wind speed exceeds a predetermined rated average wind speed or when the circumferential speed or rotational speed of the rotor exceeds a predetermined allowable value.

According to such a configuration, since the rotor and the generator connected to the rotor are prevented from over-rotating, so that their durability is improved.

According to the wind power generation method and the wind power generation device of the present invention, it is enabled to efficiently generate power while preventing beforehand the rotor from stalling due to cogging torque or power generation load.

DESCRIPTION OF THE EMBODIMENTS

Hereinafter, embodiments of the present invention are described by reference to drawings. In the following embodiments, it is explained wind power generation systems and wind power generation methods equipped with a vertical axis wind turbine that the turning radius of a blade is 1 m and the wing length of the blade is 1.2 m, as an example.

Needless to say, it is not limited to this dimension as for the wind power generation system.

Figure 1:
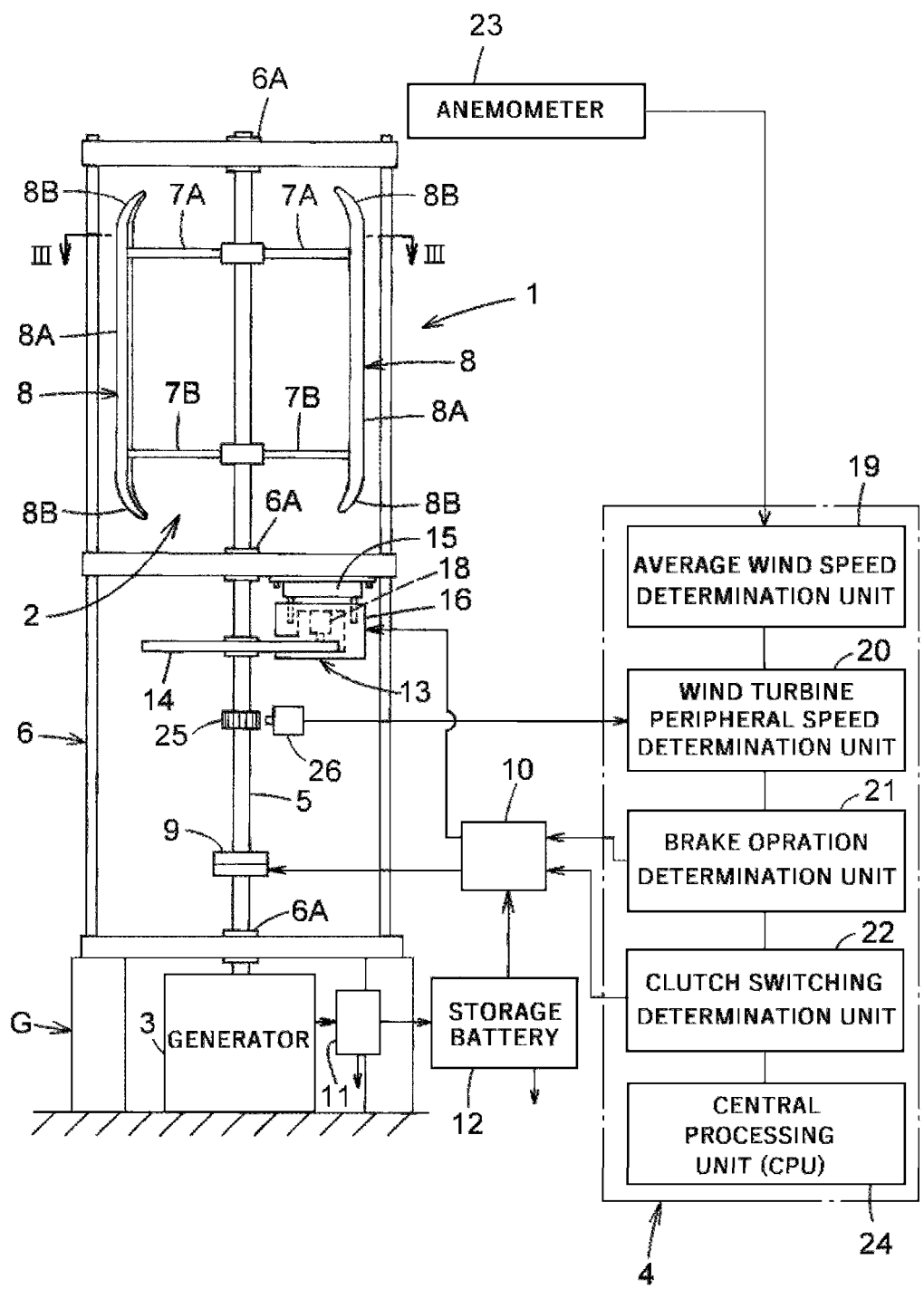
FIG. 1 is a front view of a wind power generation system according to a first embodiment of the present invention.

FIG. 1 shows a first embodiment of a wind power generation system equipped with a vertical axis wind turbine according to the present invention. The wind power generation system 1 comprises a vertical axis type rotor 2, a generator 3, and a control device 4 for controlling rotation speed of the wind turbine.

A vertical main shaft 5 of the rotor 2 constituting the longitudinal axis wind turbine is rotatably supported on a support frame 6 provided on the upper surface of a foundation G, via a bearing 6A.

In the upper half of the vertical main shaft 5, inner ends of two horizontal arms 7A, 7A, and 7B, 7B, which are oriented outward on the upper and lower horizontal planes and are aligned on a straight line, are secured.

On the outer end portions of the horizontal arms 7A and 7B aligned in the vertical direction, the inner surfaces of the upper and lower end portions of lift type blades (hereinafter abbreviated as blades) 8 facing in the vertical direction are fixed.

The horizontal support arms 7A, 7B and the blades 8 are formed of the fiber strengthening synthetic resin, for example. In addition, the horizontal support arms 7A, 7B and the blades 8 can be integrally molded.

The blades 8 have substantially the same shape as the blade describes in JP 4907073 (B2) and JP 2011-169292 (A) which are developed by the same inventor of this patent application.

Namely, the chord length of the blade 8 is set to 20%~50% of the turning radius of the blades 8, and wings area are set widely.

Figure 3:
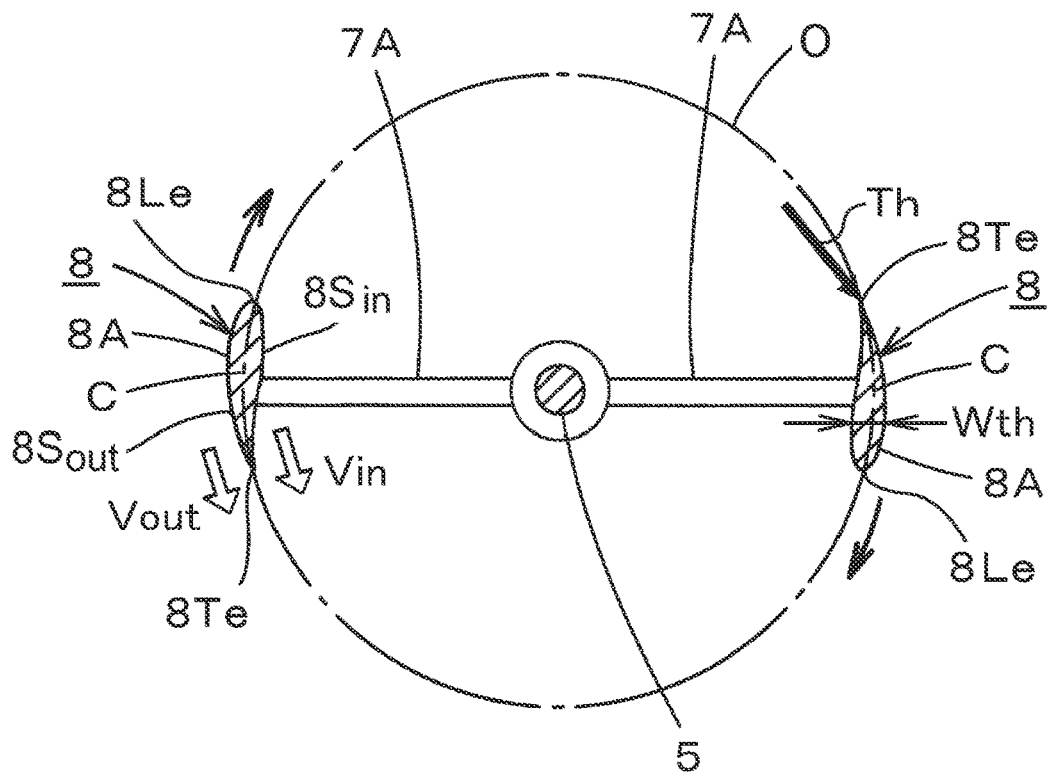
FIG. 3 is an enlarged cross section plan view in the III-III line of FIG. 1.

As shown in FIG. 3 enlarged, regarding to the sectional shape of a main part 8A except both of the upper and lower ends in the blades 8, the wing thickness Wth in the inner side 8Sin and the outer side 8Sout on a wings thickness central line C of the main part 8A are formed approximately symmetrically and are almost equal size with each other. The wings thickness central line C is set to mostly overlap with the rotation locus O of the wing thickness center of the blades 8.

Figure 2:
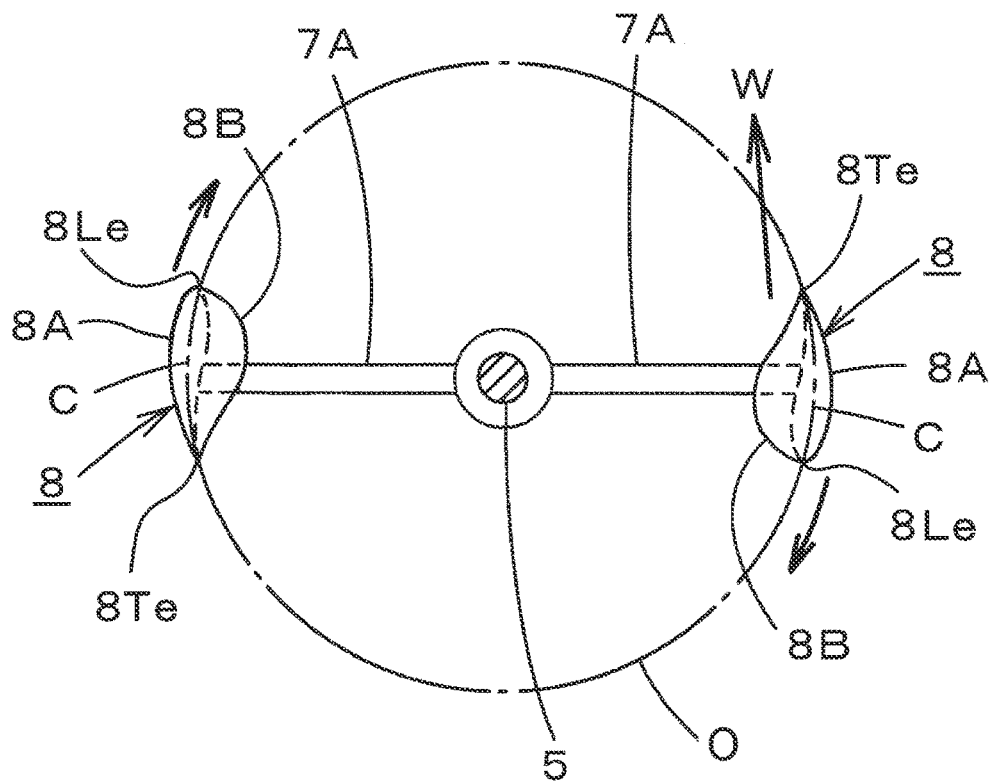
FIG. 2 is a front enlarged plan view of a rotor and a support arm of the first embodiment.

As shown in FIG. 2, the planar form of the entire main part 8A is curved in an arc shape along with the rotation locus O of the wings thickness. The internal surface of the main part 8A is tilted in the centrifugal direction from a lobe portion of a leading edge 8Le to a trailing edge 8Te, so that when a wind hits the internal surface from back, the blades are pushed forward.

The cross-sectional shape of the main part 8A is designed to be close to a standard wing type in which a blade thickness at the front side is thick and gradually becomes thinner toward the rear.

When the blades 8 rotates forward in its leading edge direction, based on the difference of the internal and external rotating radius of the blades 8, the peripheral speed of the outer peripheral surface becomes larger than that of the internal surface, therefore, the airflow ($V_{out}$) passing rearward along the outer peripheral surface is faster than that ($V_{in}$) of the inner peripheral surface.

For that reason, at the back edge of the blade 8, the pressure of the air flow ($V_{out}$) passing through the outer surface becomes small rather than that of the air flow ($V_{in}$) passing through the internal surface, by the Coanda effect on the outer surface, the outer surface of the back edge of the blade 8 is pushed to the front edge part direction from back, so that thrust Th in the rotational direction acts on the blade 8, and the rotation of the blade 8 is promoted.

For that reason, at the back edge of the blade 8, the pressure of the air flow passing through the outer surface becomes small rather than that of the airflow passing through the internal surface, by the Coanda effect on the outer surface, the outer surface of the back edge of the blade 8 is pushed to the front edge part direction from back, so that thrust Th in the rotational direction acts on the blade 8, and the rotation of the blade 8 is promoted.

As shown in FIGS. 1 and 2, inwardly tilted parts 8B, 8B which are inclined in an arc shape are formed in the upper and lower end portions of the blade 8 inwardly, that is, in the direction of the vertical main shaft 5, so that as the blade 8 rotates, the airflow diffusing in the vertical direction along the inner surface of the main part 8A is received by the inwardly tilted parts 8B increase the rotational force.

Air flowing in the vertical direction along the inner and outer side surfaces of the main part 8A passes through the inner and outer surfaces of the upper and lower inwardly inwardly tilted parts 8B, 8B in the rearward direction, that is, in the direction W in FIG. 2 by the Coanda effect, so that the rotor 2 rotates with high rotation efficiency even at a relatively low wind speed.

An electromagnetic clutch 9 is provided at an intermediate portion of the vertical main shaft 5 for intermitting power transmission from the vertical main shaft 5 to the generator 3. As the electromagnetic clutch 9, for example, it is preferable to use a known friction type connected slightly slipping, that is, via a half clutch state. Since the impact torque at the time of connection is alleviated by the electromagnetic clutch 9, the rotational driving force of the rotor 2 can be smoothly transmitted to the generator 3.

Power is supplied to the electromagnetic clutch 9 via a power feeder 10 connected to a storage battery 12 described later.

The generator 3 is provided on the foundation G, and the lower end part of the vertical main shaft 5 is connected with the rotor shaft (not shown) of the generator.

The generator 3 may be a well-known single phase generator or a well-known three phase alternating current generator. Electric power generated by the generator 3 is stored in the storage battery 12 via a controller 11 having a rectifier and a voltage regulator etc. (not shown), and then the electric power is supplied to an external direct-current load from the storage battery 12 or directly supplied to an external alternating current load system from the controller 11.

The controller 11 adjusts the amount of output current from the generator 3 and controls current and voltage which are output to the storage battery 12 or a direct-current load power supply. In addition, the generator 3 may be a direct current generator which can supply electric power directly to the storage battery 12 or a direct-current load power supply system.

In the intermediate part of the vertical main shaft 5, a disk brake device 13 capable of decelerating or stopping the rotation of the rotor 2 is provided.

Figure 4:
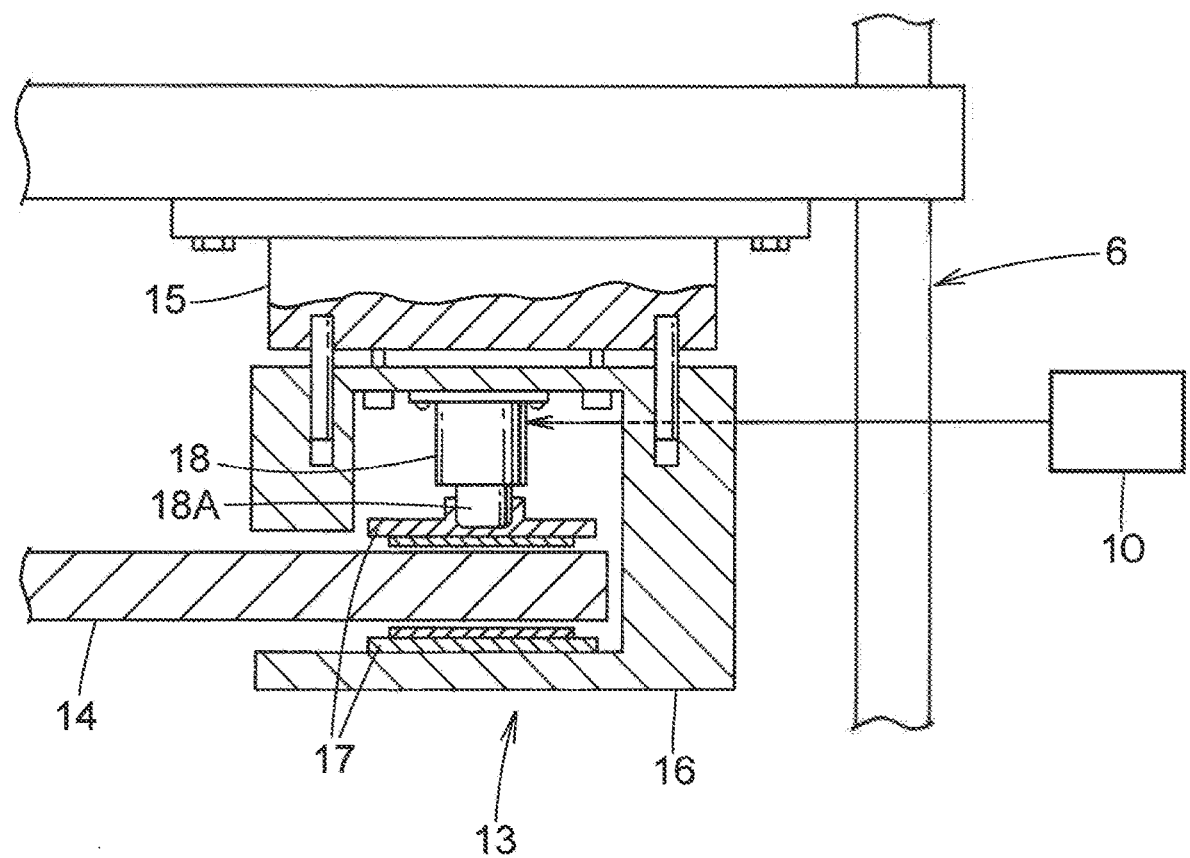
FIG. 4 is an enlarged sectional view showing details of a disc brake device.

The disk brake device 13 comprises, as also shown in the enlarged sectional view of FIG. 4, a brake disc 14 of large diameter fixed to the intermediate part of the vertical main shaft 5, a caliper 16 accommodating a part of the peripheral end portion of the brake disc 14 and mounted on a bracket 15 fixed to the intermediate part proper place of the support frame 6 so as to be vertically movable and non-rotatable, a pair of brake pads 17, 17 provided inside of the caliper 16 and is capable of pressing the upper and lower surfaces of the circumferential end of the brake disc 14, and an electromagnetism actuator 18 composed of solenoid, which is housed inside the caliper 16 and whose lower end portion of a plunger 18A facing downward is press-fitted to the upper surface of the upper brake pad 17.

As will be described in detail later, when the average wind speed toward the rotor 2 exceeds a predetermined rated average wind speed or when the peripheral speed or the rotation speed of the rotor 2 exceeds an allowable value defined beforehand, the electromagnetic actuator 18 is turned ON with the electric supply signal output from a clutch changeover determination unit 22 (described later) of the control device 4 to the power feeder 10 to operate the disc brake device 13, so as to prevent from over speeding rotation of the rotor 2 and the power generation system 3 exceeding the allowable value under strong wind.

When the electromagnetic actuator 18 is turned ON, the plunger 18A pushes the upper brake pad 17 against the upper surface of the peripheral edge of the brake disc 14. Due to the reaction force of the plunger 18A, the caliper 16 moves upwards with the reaction force of pushing force and pushes the lower brake pad 17 against the lower surface of the peripheral edge of the brake disc 14. By the frictional force at this time, braking force acts on the brake disc 14 and the vertical main shaft 5, so that the rotation of the rotor 2 is decelerated or stopped.

The control device 4 comprises an average wind speed determination unit 19, a wind turbine peripheral speed determination unit 20, a brake operation determination unit 21, and a clutch changeover determination unit 22.

The average wind speed determination unit 19 is connected to an anemometer 23 which is wind speed detection means for detecting the average wind speed of the wind toward the rotor 2 at regular time intervals. The average wind speed detected by the anemometer 23 is input to the average wind speed determination unit 19 and is processed by a central processing unit (CPU) 24 of the control device 4. When it is determined that the wind speed is equal to or lower than the predetermined average wind speed, the determination signal is output to the clutch changeover determination unit 22. The detection time of the average wind speed by the anemometer 23 is preferably performed at relatively short intervals of, for example, 10 seconds or less.

Although detailed explanation is mentioned later, the clutch changeover determination unit 22 outputs a determination signal to the power feeder 10, when the anemometer 23 detects a predetermined average wind speed or less, for example, when it is detected 2 m/s or less that is the cut-in wind speed at which power generation is started by the generator 3, and with this determination signal, the power supply from the power feeder 10 is stopped and the electromagnetic clutch 9 is disconnected. As a result, the rotational driving force of the vertical main shaft 5 is not transmitted to the generator 3, so that the power generation by the generator 3 is stopped and the rotor 2 idles.

Another determination signal is also output to the clutch changeover determination unit 22 based on data input from a rotation speed detection sensor 26 to be described later to the wind turbine peripheral speed determination unit 20.

On a proper place of the intermediate part of the vertical main shaft 5, a spur gear 25 for measuring rotation speed of the rotor 2 is attached, and the rotation number of this spur gear 25 is detected by the rotation speed detection sensor 26, so that the rotation speed of the rotor 2 can be detected via the vertical main shaft 5. Instead of the spur gear 25, one or plural convex portions may be provided on the outer peripheral surface of the vertical main shaft 5.

For the rotation speed detection sensor 26, a noncontact sensor is used, such as a magnetic rotation speed detection sensor, an ultrasonic rotation speed detection sensor, or a rotary encoder, for example.

The rotation speed detected by the rotation speed detection sensor 26 is input to the wind turbine peripheral speed determination unit 20 of the control device 4, and based on the input rotation speed, the Central Processing Unit 24 of the control device 4 calculates an average peripheral speed of the rotor 2. Namely, since the length of the outer circumference ($2\pi r$) of the rotor 2 is decided from the turning radius (r) of the blades 8 of the rotor 2, if the length of the outer circumference ($2\pi r$) is multiplied by the rotation speed (rps) of the vertical main shaft 5, it is converted into the peripheral speed (m/s).

The rotation speed detection sensor 26 and the wind turbine peripheral speed determination unit 20 constitute rotation a speed detection means.

The peripheral speed of the rotor 2 can be determined also, by detecting an angular velocity of the blades 8 using a sensor. Namely, the value which multiplied the angular velocity (rad/s) of the blades 8 by the turning radius (r) is the peripheral speed of the rotor 2.

When the wind turbine peripheral speed determination unit 20 determines that the average peripheral speed of the rotor 2 has reached a specific value, for example, 5 m/s, power is supplied from the power feeder 10 to the electromagnetic clutch 9 based on the determination signal output from the wind turbine peripheral speed determination unit 20 to the clutch changeover determination unit 22, and the electromagnetic clutch 9 is turned ON, whereby the rotational driving force of the vertical main shaft 5 is transmitted to the generator 3 for generating electricity.

The disc brake device 13 is operated by a signal input from the average wind speed determination unit 19 of the control unit 4 to the brake operation determination unit 21. Namely, when the anemometer 23 detects that it has reached the predetermined rated average wind speed (for example, 13 m/s), a signal is input from the average wind speed determination unit 19 to the brake operation determination unit 21, and based on a power supply signal output from the brake operation determination unit 21 to the power feeder 10, electric power is supplied to the electromagnetic actuator 18 of the disc brake device 13, the electromagnetic actuator 18 is turned ON, and the disc brake device 13 is operated, so that the rotor 2 is decelerated or stopped.

Further, the disc brake device 13 is operated even when the peripheral speed or the rotational speed of the rotor 2 exceeds a predetermined allowable value, on the basis of the operation signal outputted from the brake operation determination unit 21 to the electromagnetic actuator 18, so that the rotor 2 is decelerated or stopped.

The allowable value of the peripheral speed or the rotational speed of the rotor 2 is appropriately set according to the rotational radius of the rotor 2, the size of the blade 8, the rated output or the rated rotational speed of the generator 3, etc.

Figure 5:
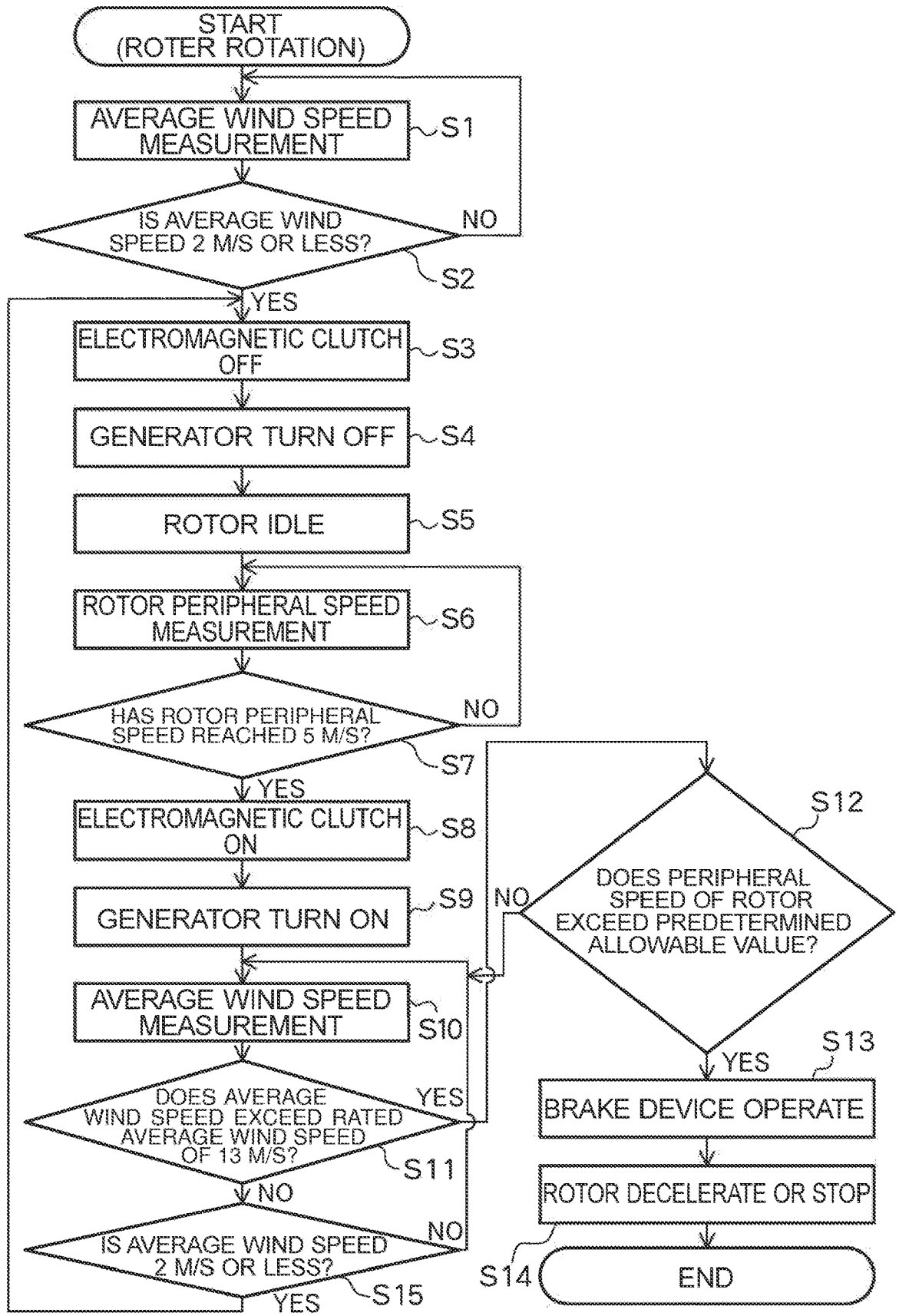
FIG. 5 is a flowchart for implementing the method of the present invention using the wind power generation system of the first embodiment.

Next, regarding to the wind power generation method using the wind power generation system 1 according to the first embodiment will be described with reference to the flow chart shown in FIG. 5.

At first, when the electromagnetic clutch 9 is connected and the generator 3 is operating, the average wind speed when the rotor 2 is rotating is measured by the anemometer 23 (S1), and based on the measured value, the average wind speed determination unit 19 and the Central Processing Unit 24 of the control device 4 determines whether the average wind speed is equal to or less than the cut-in wind speed, for example, 2 m/s or less (including 0) (S2).

When it is determined that the average wind speed is less than 2 m/s (S2), a judgment signal is outputted from the average wind speed determination unit 19 of the control device 4 to the clutch change determination unit 22. By the judgment signal, the power supply from the power feeder 10 to the electromagnetic clutch 9 is stopped, whereby the electromagnetic clutch 9 is turned off (S3).

As a result, the power transmission from the vertical main shaft 5 to the generator 3 is cut off, so that the generator 3 is turned off (S4), the power generation is temporarily stopped, and the rotor 2 idles (S5).

If it is not determined that the average wind speed is 2 m/s which is the cut-in wind speed or less, the process returns to S1 and the average wind speed is continuously measured.

The reason why the electromagnetic clutch 9 is turned off to temporarily stop power generation when the average wind speed is determined to be 2 m/s or less is that, because at low wind speeds of 2 m/s or less, the rotor 2 tends to stall upon receipt the influence of the cogging torque of the generator 3 or the power generation load.

When the electromagnetic clutch 9 is turned OFF and the power generation by the generator 3 is stopped, the cogging torque and the power generation load of the generator 3 are not transmitted to the vertical main shaft 5. So that the rotor 2 idly rotates smoothly without resistance, and the rotor 2 continues to rotate with inertia without stalling even at a low wind speed of 2 m/s or less.

Accordingly, when the rotor 2 is idling, if the wind condition improves even slightly, the rotor 2 is further accelerated and continues idling.

Based on the data output from the rotation speed detection sensor 26, the wind turbine peripheral speed determination unit 20 and the central processing unit 24 measure the average peripheral speed when the rotor 2 is idling (S6), and it is judged whether the average peripheral speed of the rotor 2 has reached 5 m/s, for example (S7).

When the average peripheral speed of the rotor 2 reaches 5 m/s, the electromagnetic clutch 9 is turned ON (S8) by the feeding signal output to the power feeder 10 from the clutch changeover determining unit 22, and the generator 3 is connected, and the rotational driving force of the vertical main shaft 5 is transmitted to the generator 3. As a result, the generator 3 which has been stopped is turned ON (S9), and power generation is started. If it is determined that the average peripheral speed of the rotor 2 has not reached 5 m/s, for example, the process returns to step S6, and the average peripheral speed of the rotor 2 is continuously measured.

The reason for determining whether or not the average peripheral speed of the rotor 2 has reached 5 m/s is as follows.

That is, in the rotor 2 of the vertical shaft type provided with the lift type blade 8 having the above-described shape, when the average peripheral speed of the rotor 2 reaches 5 m/s, by the action of the inwardly tilted part 8B at the upper and lower end portions of the blade 8 and the Coanda effect, the lift (thrust) which generated in the blades 8 increases, thereby the rotor 2 efficiently rotates while accelerating itself to the peripheral speed exceeding the wind speed by itself.

In this manner, when the average peripheral speed of the rotor 2 reaches 5 m/s and the rotor 2 idly rotates while being accelerated by its own power, if the electromagnetic clutch 9 is turned to operate the generator 3, there is little risk of stalling of the rotor 2 due to the cogging torque or the power generation load, so that the power generation efficiency can be enhanced.

As an example of the rotation speed of the rotor 2 in case the peripheral speed is 5 m/s, since there is a relation among the peripheral speed, the rotation speed and the length of the outer circumference as mentioned above, when the turning radius (r) of the blade 8 is set 1 m, for example, the length of the outer circumference of the rotor 2 ($2\pi r$) is 6.28 m. Therefore, by dividing the peripheral speed 5 m/s by the outer circumference 6.28 m, and multiplies by 60 for converting into speed per minute, the rotation speed of the rotor 2 is about 48 rpm.

When the generator 3 is turned ON and generating power, the average wind speed is measured by the anemometer 23 (S10), based on the calculation result of the average wind speed determination unit 19 and the central processing unit 24, it is judged whether or not the average wind speed exceeds the rated average wind speed, for example 13 m/s (S11). When the average wind speed exceeds the rated average wind speed 13 m/s, next, the wind turbine peripheral speed determination unit 20 judges whether or not the peripheral speed or rotational speed of the rotor 2 exceeds a predetermined allowable value (S12).

When the peripheral speed or the rotational speed of the rotor 2 exceeds the allowable value, the disk brake device 13 is operated by the feeding signal outputted to the power feeder 10 from the brake operation determination unit 21 (S13), and the rotor 2 is decelerated or stopped (S14).

Thereby, it is prevented the rotor 2 or the generator 3 over-rotates beyond the rated value and this enables to protect them and improve the durability.

Even when the wind speed exceeds the rated average wind speed of 13 m/s, power generation continues without stopping the rotor 2 until the peripheral speed or rotation speed of the rotor 2 exceeds the allowable value and the brake device 13 operates. As a result, power generation efficiency is improved.

Further, if the supply amount of the generated power to the external load or the like is increased and a large electric load is applied to the generator 3 before operating the brake device 13, this enables to brake the rotor 2. If the peripheral speed or the rotational speed of the rotor 2 does not exceed the predetermined allowable value, the process returns to step S10 and the average wind speed is continuously measured.

If it is determined that the rated average wind speed does not exceed 13 m/s in step 11, it is again determined whether the average wind speed is 2 m/s or less in step 15 and if the average wind speed is equal to or less than 2 m/s, the process returns to step S3, and in the same way as above, the electromagnetic clutch 9 is turned OFF, the generator 3 is turned OFF (S4), and the power generation is temporarily stopped, thereby causing the rotor 2 to idle. If it is not determined that the average wind speed is 2 m/s or less, the process returns to S10 and the average wind speed is continuously measured.

By repeating these steps S3-S15 in a loop shape, power generation efficiency can be improved sharply.

As explained above, in the wind turbine generator 1 according to the first embodiment and the wind power generation method using the same, since the following processes are repeated, so that this enables to efficiently generate power while preventing beforehand the rotor 2 from stalling due to cogging torque or power generation load.

That is, the generator 3 is intermittently connected to the vertical main shaft 5 of the rotor 2 via an electromagnetic clutch 9, and when the rotor 2 rotates at a low wind speed of not more than the average wind speed of 2 m/s which is the cut-in wind speed, the electromagnetic clutch 9 is disconnected by the control device 4 to idle the rotor 2, when the rotor 2 reaches the average peripheral speed 5 m/s at which the rotor 2 can efficiently rotate while accelerating by itself, it is controlled such that the generator 3 can generate power by connecting the electromagnetic clutch 9, and when the rotor 2 again rotates at a low wind speed of not more than the average wind speed of 2 m/s, the electromagnetic clutch 9 is again disconnected by the control device 4 and the rotor 2 idly rotates until it reaches an average peripheral speed of 5 m/s which can be rotated efficiently while accelerating with its own power, the electromagnetic clutch 9 is again connected and electricity is generated by the generator 3.

Figure 6:
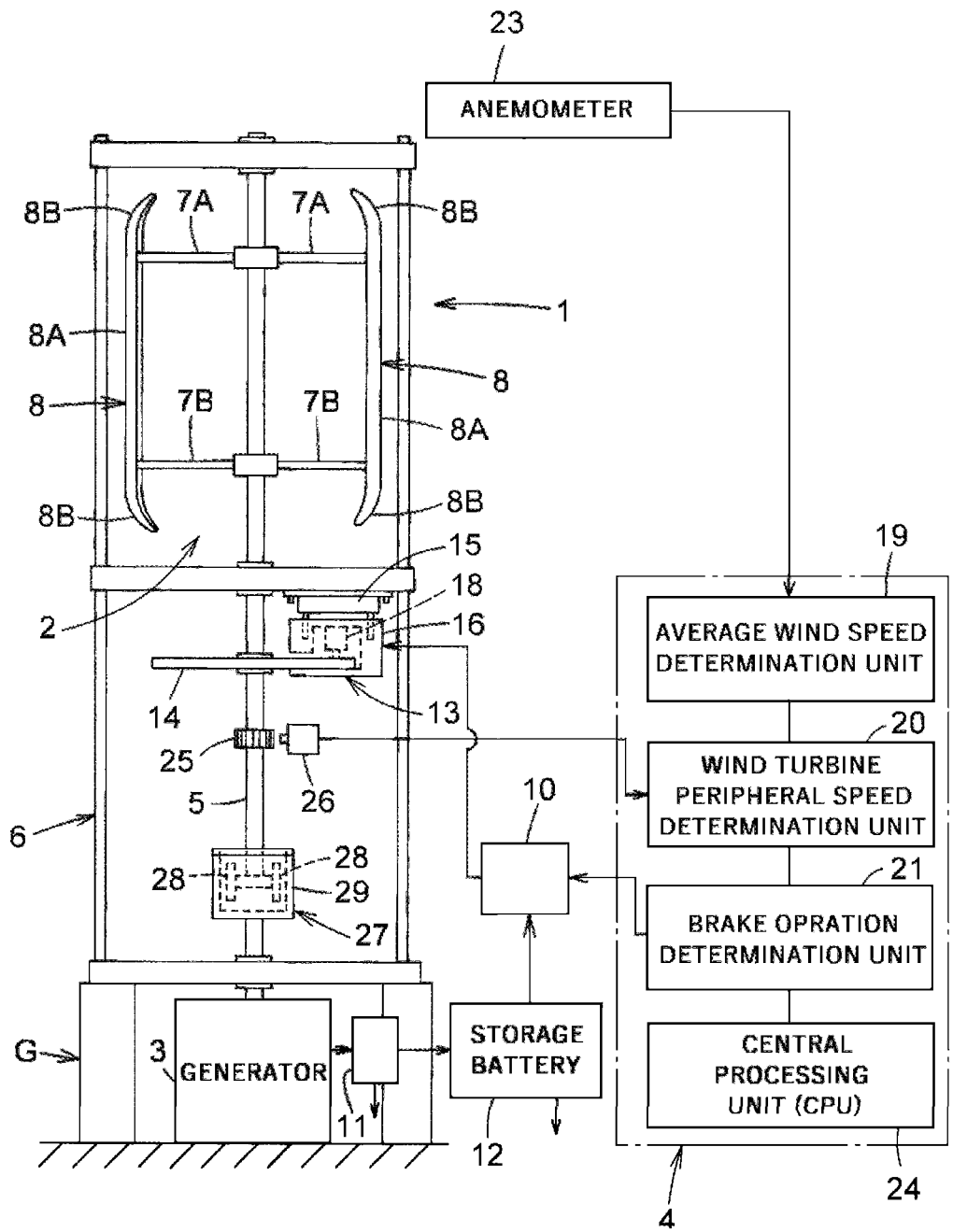
FIG. 6 is a front view of a wind power generation system according to a second embodiment of the present invention.

Next, a second embodiment of a wind power generation system according to the present invention will be described referring to FIG. 6. The same reference letters are given to the same component of the wind power generation system of the first embodiment and detailed description thereof is omitted.

In the wind turbine generator of the second embodiment, a centrifugal clutch 27 is used instead of the electromagnetic clutch 9 of the wind turbine generator 1 of the first embodiment. The centrifugal clutch 27 schematically shown in FIG. 6 is configured as follows.

That is, a plurality of weights 28 to each of which a friction material is secured to the outer peripheral surface are attached to the vertical main shaft 5 on the side of the rotor 2 which is divided into two at the intermediate portion, each of the weights can be movable radially outward by centrifugal force, and a cylindrical driven drum 29 is fixed to the vertical main shaft 5 on the generator 3 side so that the weights 28 are accommodated therein.

The wind power generation by the wind turbine generator of the second embodiment is carried out as follows.

In the wind turbine generator of the second embodiment, when the centrifugal force acting on the weights 28 is small, that is, when the rotor 2 is rotating at a low wind speed of not more than the average wind speed of 2 m/s which is the cut-in wind speed, the weights 28 are set to be separated from the inner surface of the driven drum 29. Therefore, when the average wind speed of the rotor 2 is 2 m/s or less, the centrifugal clutch 27 automatically turns off, the power generation by the generator 3 stops, and the rotor 2 idles.

Further, when the average peripheral speed of the rotor 2 reaches, for example, 5 m/s, that is, when the rotational speed of the vertical main shaft 5 reaches a predetermined value corresponding to the average peripheral speed of 5 m/s, the weights 28 come into contact with the inner surface of the driven drum 29 by the centrifugal force, thereby the centrifugal clutch 27 is automatically connected so that power generation by the generator 3 is started.

In the case where the centrifugal clutch 27 is provided in a large-sized wind turbine generator having a slow rotational speed of the vertical main shaft 5, in order to effectively operate the centrifugal clutch 27, the rotation speed of the vertical main shaft 5 may be increased through a speed increaser.

Similar to the first embodiment, when the rated average wind speed exceeds 13 m/s or the peripheral speed or rotational speed of the rotor 2 exceeds the allowable value, the disc brake device 13 is actuated by the control device 4.

Since the wind power generation method by the wind turbine generator of the second embodiment is also controlled as follows, so that the rotor 2 is prevented beforehand from stalling due to cogging torque or power generation load as in the first embodiment and it can generate electricity efficiently. That is, when the rotor 2 rotates at a low wind speed of not more than the average wind speed of 2 m/s which is the cut-in wind speed, the centrifugal clutch 27 is automatically disconnected and the rotor 2 idles, and when the average peripheral speed reaches 5 m/s and the rotor 2 rotates while accelerating with its own power, the centrifugal clutch 27 is automatically connected, so that power generation is started by the generator 3.

In addition, when the mechanical centrifugal clutch 27 is used, the clutch changeover determination unit 22 for controlling the electromagnetic clutch 9 ON and OFF as in the first embodiment is unnecessary. Therefore, the control circuit etc. of the control device 4 becomes simple.

The present invention is not limited to the above-mentioned embodiments, and within the limits which does not deviate from the summary of the present invention, this enables to give various modifications and changes, as follows.

In the first embodiment, although it is controlled that when the average wind speed is 2 m/s or less, the electromagnetic clutch 9 is turned OFF so that the power generation by the generator 3 is stopped. Instead of this, the power generation by the generator 3 may be stopped such that when detecting the average rotational speed of the vertical main shaft 5 or the average peripheral speed of the rotor 2 when the average wind speed is 2 m/s or less, the electromagnetic clutch 9 is turned OFF and the power generation by the generator 3 is stopped.

Moreover, in the first embodiment, although when the average peripheral speed of the rotor 2 reaches 5 m/s, the electromagnetic clutch 9 is turned ON so that the generator 3 starts power generation. Instead of this, since the peripheral speed of the rotor 2 can be converted into the rotation speed of the rotor as mentioned above, the power generation by the generator 3 may be started such that when the rotation speed detection sensor 26 detects the rotational speed of the rotor 2 when the average peripheral speed reaches 5 m/s, the electromagnetic clutch 9 is turned on so that the electric power generation can be started by the generator 3.

In the first embodiment, although the electromagnetic clutch 9 is turned OFF and the average wind speed of the rotor 2 for stopping the power generation by the generator 3 is set to 2 m/s or less, but the upper limit value of the average wind speed at this time is set appropriately according to the magnitude of the turning radius.

For example, when the turning radius of the blade 8 is smaller than 1 m in the above embodiment, since the rotational torque of the rotor 2 becomes small, and the influence of the cogging torque and the power generation load becomes more likely to occur, so that the upper limit value of the average wind speed at which the electromagnetic clutch 9 is turned OFF may be set to 2 m/s or more.

In addition, when the turning radius of the blade 8 is larger than 1 m, even if the rotational speed of the rotor 2 is low, since the rotational torque becomes large, and the influence of the cogging torque and the power generation load becomes unlikely, so that the upper limit value of the average wind speed at which the electromagnetic clutch 9 is turned OFF may be set to 2 m/s or less.

With the above embodiments, when the average peripheral speed of the rotor 2 reaches 5 m/s, the electromagnetic clutch 9 is turned ON to start power generation by the generator 3, but in this case the value of the average peripheral speed may be appropriately set according to the magnitude of the turning radius of the blade 8.

With the above embodiments, the mechanical disk brake device 13 including the electrically controllable electromagnetic actuator 18 is used as the brake device that decelerates or stops the rotation of the rotor 2, but it is also possible to use a known electromagnetic brake or a non-contact type eddy current type disc brake device or the like can also be used.

Instead of the electromagnetic actuator 18, a piston operated by fluid pressure may be provided and the disc brake device 13 can also be actuated by the fluid pressure piston by pressure-feeding pressure oil or compressed air to the piston with a hydraulic pump or an air pump that can be driven by the power feeder 10 or a commercial power supply. In order to increase the braking force, a plurality of such disk brake devices 13 may be provided so as to operate in synchronization with each other around the brake disk 14.

According to the first embodiment, the electromagnetic clutch 9 is used to intermittently apply the rotational driving force of the vertical main shaft 5 of the rotor 2, but it is also possible to use, for example, a friction clutch or a meshing clutch or the like with an electric actuator that can be turned on and off by the control device 4.

By providing a braking device such as the disc brake device 13 as described above on the wind turbine generator for preventing excessive rotation of the rotor 2 and the generator 3, it is also possible to operate the disc brake device 13 to decelerate or stop the rotor 2, even when any abnormal situation occurs in the wind turbine generator. For example, in the case where the electromagnetic clutch 9, the centrifugal clutch 27, the generator 3, other electric parts fail, if an abnormality occurs in the electric circuit or the like of the control device 4, abrasion or the like occurs in the bearing 6A or the like of the vertical main shaft 5, etc., the rotor 2 can be decelerated or stopped.

Although not shown, a manual brake device for forcibly stopping the rotation of the vertical main shaft 5 may be provided in preparation for a case where the disc brake device 13 alone can't decelerate or stop the rotor 2. In this way, the rotor 2 can be urgently stopped by using a manual brake device together with the disc brake device, in case of a strong wind or an abnormal situation in the wind turbine generator.

The present invention can also be applied to a wind power generation system in which plural lift type blades are fixed to the vertical main shaft 5 in multiple stages as indicated in FIG. 4 of JP 4907073 (B2) or a wind power generation system comprising a horizontal axis wind turbine in which the tip portion of the blade is inclined in the main shaft direction (wind receiving direction) as indicated in JP 4740580 (B2).

The invention claimed is:

1. A wind power generation system, comprising:
a wind turbine having a vertical axis rotor with a vertical main shaft and multiple blades;
a support frame being mounted on a foundation and supporting the vertical main shaft of the rotor via a bearing;
a generator being disengagably connectable, via an electromagnetic clutch, to a lower end of the vertical main shaft of the rotor, the electromagnetic clutch being arranged between the main shaft and the generator such that disengagement of the electromagnetic clutch interrupts transmission of power between the main shaft and the generator;
an anemometer for detecting an average wind speed;
a rotational speed sensor for detecting an average peripheral speed of the rotor;
a control device being configured to control a rotational speed of the wind turbine based on output from the anemometer and on output from the rotational speed sensor,
wherein the multiple blades are connected to the vertical main shaft at a fixed distance from the vertical axis and thereby defining a rotation locus (O) around the vertical main shaft,
wherein each blade of the multiple blades is a lift type blade having a main part and two end portions, the main part extending parallel to the vertical main shaft, and the two end portions being provided at respective upper and lower ends of the main part,
wherein each of the two end portions of each blade has an inwardly tilted part tilted inwardly toward the main shaft,
wherein a cross-section of the main part of each blade has a shape of an airfoil in which a wing thickness (Wth) of the main part gradually becomes smaller in a rotational direction from a front side of the main part toward a trailing edge (8Te) of the main part,
wherein the cross-section of the main part is curved in an arc shape from a leading edge (8Le) on the front side of the main part toward the trailing edge (8Te) of the main part,
wherein the cross-section of the main part has an inner side (8Sin) located radially within the rotation locus (O) and an outer side (8Sout) located radially outside of the rotation locus (O),
wherein the leading edge and the trailing edge of the main part are located on the rotation locus (O),
wherein, a line passing through a center of the wing thickness between the leading edge and the trailing edge of the main part is defined as a wing thickness central line (C), the wing thickness central line (C) being coincident with the rotation locus (O),
the control device having an average wind speed determination unit and a clutch change determination unit,
wherein the clutch change determination unit connects or disconnects the main shaft to the generator via the electromagnetic clutch,
wherein, with the main shaft connected to the generator via the electromagnetic clutch, the average wind speed determination unit determines, based on the output from the anemometer, whether the average wind speed has reached a first speed value that is equal to or lower than a cut-in wind speed at which power can be generated by the generator, and
wherein, with the main shaft disconnected from the generator, the control device determines, based on the output from the rotational speed sensor, whether the average peripheral speed of the rotor has reached a second speed value that is higher than the cut-in wind speed, wherein the clutch change determination unit disconnects the main shaft and the generator via the electromagnetic clutch to idle the rotor when the average wind speed determination unit determines that the average wind speed has reached the first speed value, and wherein the clutch change determination unit connects the main shaft and the generator via the electromagnetic clutch for generating power by the generator when the control device determines that the average peripheral speed has reached the second speed value.

2. The wind power generation system according to claim 1, wherein the first speed value is 2 m/s, and
wherein the second speed value is 5 m/s.

3. The wind power generation system according to claim 2, wherein the system further comprises:

a brake device configured to decelerate or stop the rotor, wherein, with the main shaft connected to the generator via the electromagnetic clutch, the average wind speed determination unit determines whether the average wind speed has reached a third speed value, wherein the third speed value is 13 m/s, and wherein the brake device decelerates or stops the rotor when the average wind speed has reached the third speed value.

\* \* \* \* \*